(12) United States Patent
Kraft

(10) Patent No.: US 7,775,157 B2
(45) Date of Patent: *Aug. 17, 2010

(54) TOFU PREPPER

(76) Inventor: Marie B. Kraft, 33 Douglas St., Ambler, PA (US) 19002

( * ) Notice: Subject to any disclaimer, the term of this patent is extended or adjusted under 35 U.S.C. 154(b) by 252 days.

This patent is subject to a terminal disclaimer.

(21) Appl. No.: 11/827,167

(22) Filed: Jul. 11, 2007

(65) Prior Publication Data

US 2009/0017179 A1   Jan. 15, 2009

(51) Int. Cl.
*A23B 5/00* (2006.01)
*A47J 43/14* (2006.01)
*A01J 25/11* (2006.01)

(52) U.S. Cl. ............... 99/495; 99/507; 426/478

(58) Field of Classification Search ........... 99/495–513, 99/485–493, 537, 348–349; 100/110–116; 426/478

See application file for complete search history.

(56) References Cited

U.S. PATENT DOCUMENTS

| | | | | |
|---|---|---|---|---|
| 3,995,544 A * | 12/1976 | Farley | ................ | 100/116 |
| 5,272,969 A * | 12/1993 | McDonald | ............ | 100/110 |
| 5,320,031 A * | 6/1994 | Whitney | ............. | 99/495 |
| 6,092,460 A * | 7/2000 | Engelhardt | .......... | 99/495 |
| 6,672,204 B2 * | 1/2004 | Fiorello | ............. | 99/495 |

* cited by examiner

*Primary Examiner*—Daniel Robinson
(74) *Attorney, Agent, or Firm*—James Ray & Assoc

(57) ABSTRACT

An apparatus for easily removing excess moisture from blocks of tofu. The apparatus comprises a container which holds the tofu. A first substantially flat plate member is disposed within such container and placed on top of the tofu. A second substantially flat plate member which has a spring attached thereon engages a pair of arm like projections disposed on upper surfaces and on opposite sides of the container member. The other end of the spring engages the upper surface of the first flat plate member that sits on the top of the tofu so that as the spring exerts pressure on the first flat plate member water is removed from the tofu.

17 Claims, 5 Drawing Sheets

TOFU PREPPER

CROSS-REFERENCE TO RELATED APPLICATIONS

This application is closely related to co-pending patent application Ser. No. 11/726,548, entitled TOFU PREP, filed Mar. 22, 2007. The teachings of this related application are incorporated herein by reference thereto.

FIELD OF THE INVENTION

The present invention relates, in general, to the use of tofu, and, more particularly, the present invention relates to an apparatus and to a method for accommodating and for removing excess water from a standard block of tofu as sold in stores.

STATEMENT REGARDING FEDERALLY SPONSORED RESEARCH OR DEVELOPMENT

N/A

INCORPORATION-BY-REFERENCE OF MATERIAL SUBMITTED ON A COMPACT DISC

N/A

BACKGROUND OF THE INVENTION

Many individuals have realized the health and wellness benefits that can be obtained by simply decreasing or completely eliminating meat from their diets. Some individuals may wish to eliminate meat from their diet for animal rights reasons, as well.

Tofu is a plant based protein source that many people turn to in order to create the right balance of nutrients in their diet. Thus, tofu is widely used as a substitute for the protein that is generally obtained from eating meat. However, tofu preparation can be inconvenient and messy as many recipes require the cook to squeeze excess moisture from a block of tofu in order to prepare it. A block is the normal way that tofu is sold. Improperly prepped tofu can result in an inedible meal that can make some individuals completely give up on tofu as a meat alternative. Current methods of removing the moisture from a block of tofu include squeezing and pressing the tofu with paper towels and other heavier kitchen utensils that are generally inadequate and cumbersome and most do not always allow for storage of the tofu in the refrigerator. Thus, it would be advantageous if there were a means available that would provide those individuals who wish to remove meat from their diets a simple apparatus that can be used to easily remove excess moisture from blocks of tofu and provide a means of storing such prepared tofu.

SUMMARY OF THE INVENTION

In a first aspect the present invention provides an apparatus for removing excess moisture from blocks of tofu as commonly sold in grocery and health food stores. The apparatus comprises a container member having a first predetermined shape and a first predetermined surface area. The container member is for holding at least one block of tofu. A pair of arm like projections are disposed on upper surfaces and on opposite sides of the container member. A first substantially flat plate member having a second predetermined surface area which is less that the first predetermined surface area by an amount at least sufficient to allow moisture to flow to a surface above an upper surface of such tofu, the first substantially flat plate member is disposed inside the container member and placed on top of such at least one block of tofu. Such first substantially flat plate member having at least one raised portion on an upper surface thereof. A second substantially flat plate member engages the pair of arm like projections. A handle member is disposed on an upper surface of the second substantially flat plate member and a biasing means is caged between an inner surface of the handle member and such upper surface of the first substantially flat plate member for pressing excess moisture out of such at least one block of tofu.

In a second aspect there is provided an apparatus for removing excess moisture from blocks of tofu as commonly sold in grocery and health food stores. The apparatus comprises a container member having a first predetermined shape and a first predetermined surface area. The container member is for holding at least one block of tofu. A pair of arm like projections are disposed on upper surfaces and on opposite sides of the container member. A first substantially flat plate member having a second predetermined surface area which is less that the first predetermined surface area by an amount at least sufficient to allow moisture to flow to a surface above an upper surface of such tofu, the first substantially flat plate member is disposed inside the container member and placed on top of such at least one block of tofu. Such first substantially flat plate member having at least one raised portion on an upper surface thereof. A second substantially flat plate member engages the pair of arm like projections. A handle member is disposed on an upper surface of the second substantially flat plate member and a biasing means is engageable with a lower surface of the second substantially flat plate member and caged between the lower surface of second substantially flat plate member and the upper surface of the first substantially flat plate member for pressing excess moisture out of such at least one block of tofu.

In yet another aspect the present invention there is provided a method for removing excess moisture from blocks of tofu as commonly sold in grocery and health food stores. The method comprises the steps of providing a container member. Such first container member has a first predetermined shape and a first predetermined surface area and has a pair of arm like projections disposed on upper surfaces and opposite sides of such container member. This is followed by a step of placing at least one block of tofu in the container member. The next step is placing a first substantially flat plate member inside the container member on top of such at least one block of tofu, such first substantially flat plate member having a second predetermined surface area which is less that such first predetermined surface area by an amount at least sufficient to allow moisture to low to a surface above an upper surface of such tofu. Such first substantially flat plate member has at least one raised portion on an upper surface thereof. This is followed by the step of engaging a second substantially flat plate member having a handle member disposed on an upper surface thereof and having a biasing means connected to an inner surface of such handle member with the pair of arm like projections disposed on upper surfaces and on opposite sides of the container member. There is a step of caging the biasing means between such at least one raised portion on the upper surface of the first substantially flat plate member and an inner surface of such handle member when the second substantially flat plate member is engaged with the pair of arm like projections. A step of applying pressure on the block of tofu by the first substantially flat plate member. Such first substantially flat plate member being forced downward by the biasing means. The next step is removing water from the block of tofu by the pressure exerted by the first substantially flat plate member as a result of the action of the biasing means. Collecting the excess water removed from the block of tofu above such first substantially flat plate member and a step of storing the tofu in the container member, with excess water removed, in a refrigerated area until ready for use.

OBJECTS OF THE INVENTION

It is, therefore, one of the primary objects of the present invention to provide an apparatus for removing excess moisture from a block of tofu.

Another object of the present invention is to provide an apparatus for removing excess moisture from a block of tofu that is easy to use.

Still another object of the present invention is to provide an apparatus that is made of plastic for removing excess moisture from a block of tofu.

Yet another object of the present invention is to provide an apparatus for removing excess moisture from a block of tofu that uses a biasing means for applying pressure to such block of tofu and forcing the excess moisture out of such block of tofu.

These and various other objects and advantages of this invention will become apparent after a full reading of the following detailed description, particularly, when read in conjunction with the attached drawings as described below and the appended claims.

Figure 1:
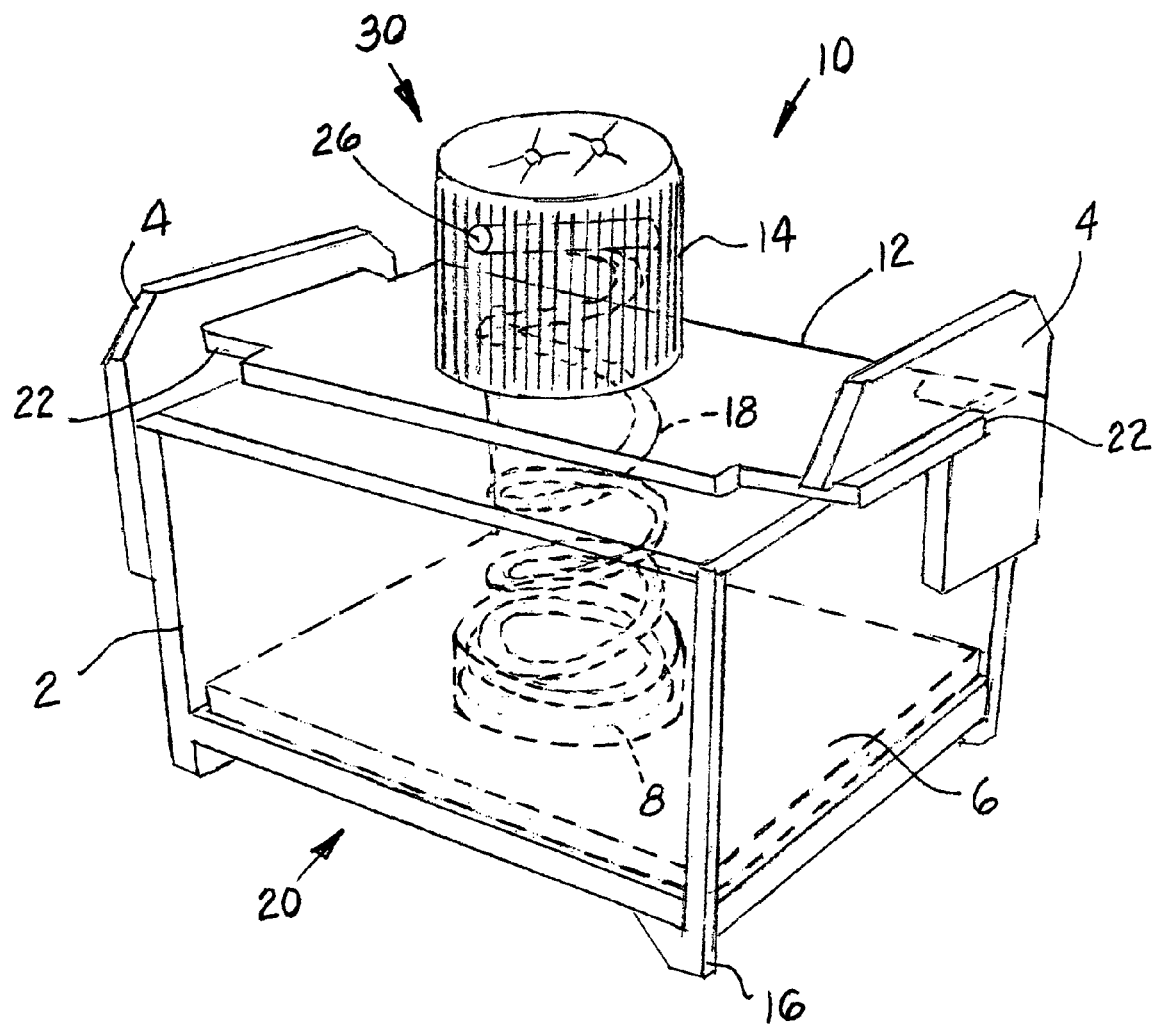
FIG. 1 is a perspective view of the apparatus for use in removing excess water from a block of tofu.
Figure 2:
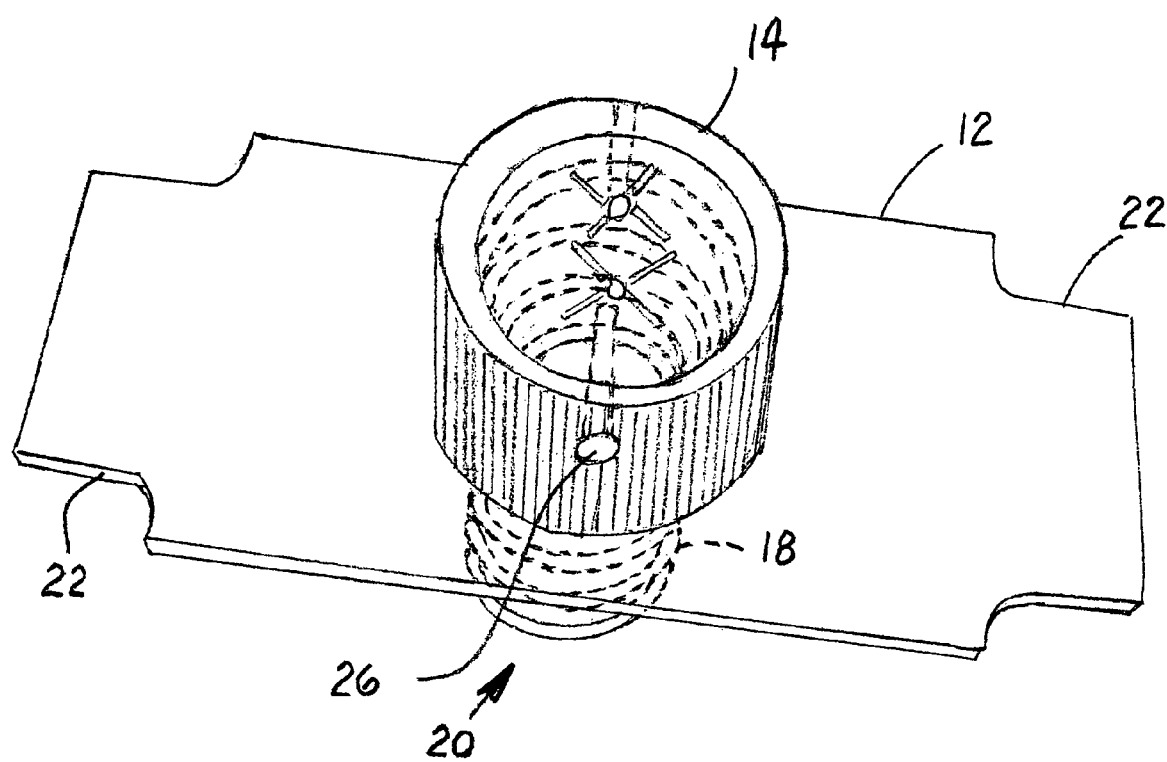
FIG. 2 is a perspective view of a second plate member having a handle member formed thereon and with a biasing means attached.
Figure 3:
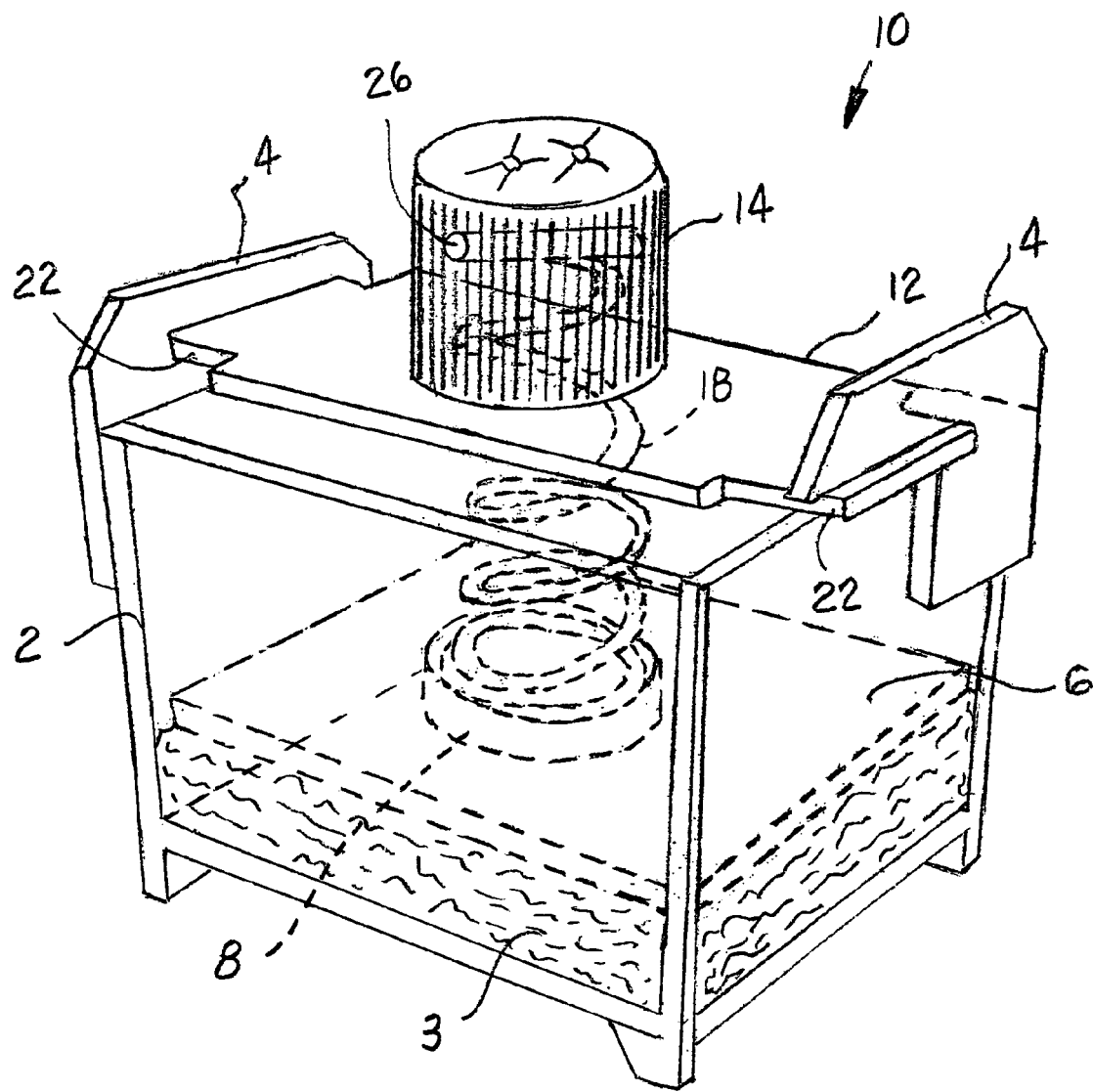
FIG. 3 is a perspective view of the apparatus from a different angle showing the second plate member engaged with the projections on the upper surfaces of the container member.
Figure 4:
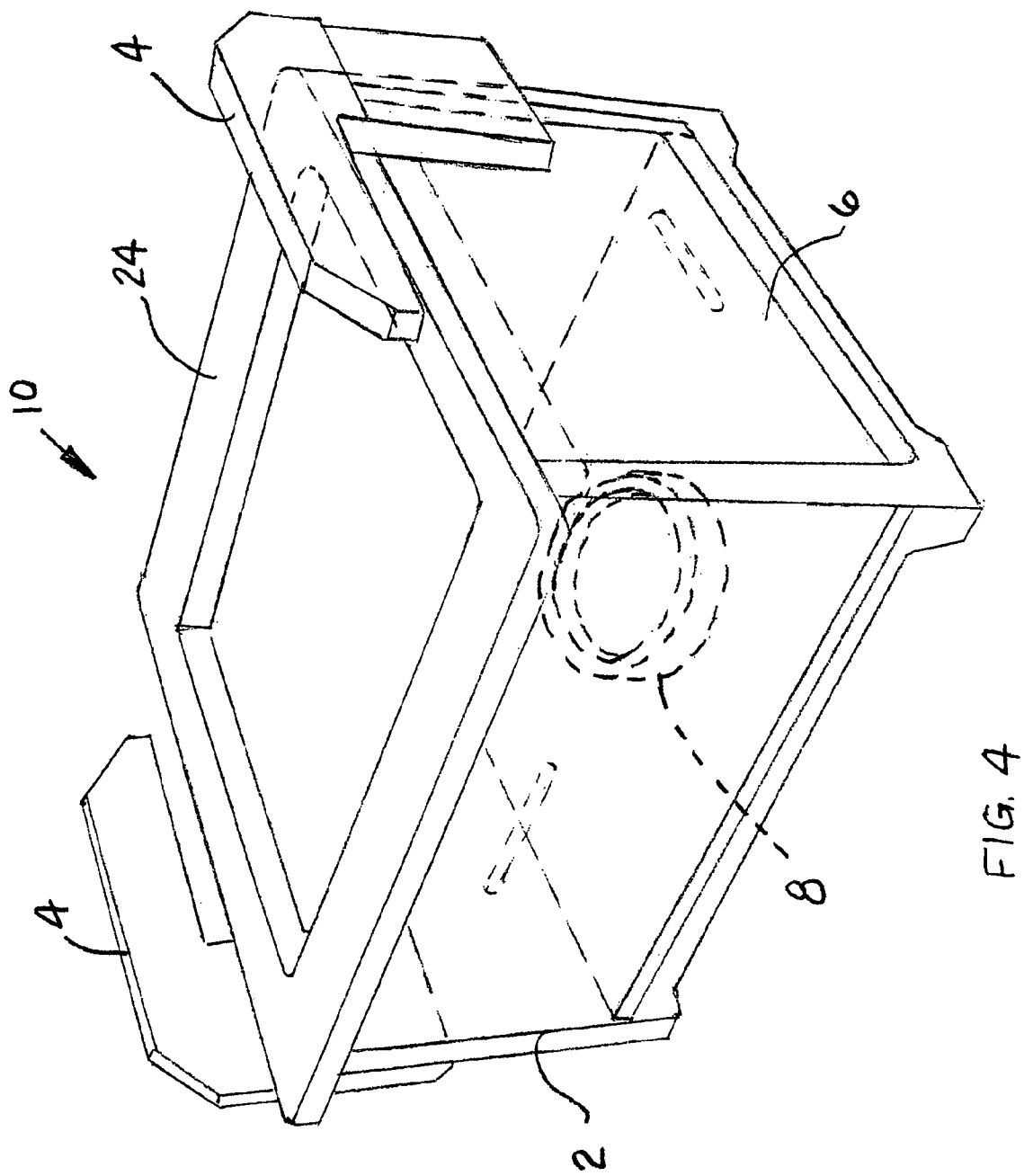
FIG. 4 is a perspective view of the container member with a lid member in place.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In a first aspect the present invention provides an apparatus, generally designated 10, for removing excess moisture from blocks of tofu as commonly sold in grocery and health food stores. The apparatus 10 comprises a container member 2 which has a first predetermined shape and a first predetermined surface area. The container member 2 is for holding at least one block of tofu 3. A pair of arm like projections 4 are disposed on upper surfaces and on opposite sides of the container member 2. A first substantially flat plate member 6 having a second predetermined surface area which is less that the first predetermined surface area by an amount at least sufficient to allow moisture to flow to a surface above an upper surface of such tofu 3, the first substantially flat plate member 6 is disposed inside the container member 2 and placed on top of such at least one block of tofu 3. Such first substantially flat plate member 6 having at least one raised portion 8 disposed on an upper surface thereof. A second substantially flat plate member 12 engages the pair of arm like projections 4. A handle member 14 is disposed on an upper surface of the second substantially flat plate member 12 and a biasing means, generally designated 20, is caged between an inner surface of the handle member 14 and such upper surface of the first substantially flat plate member 6 for pressing excess moisture out of such at least one block of tofu 3.

It should be noted that such biasing means 20 is preferably a spring 18. The spring 18 is compressed when the second flat platform member 12 is forcibly engaged with the pair of arm like projections 4 and the opposite end of the biasing means 20 is disposed within the raised portion 8 and engages the upper surface of the first substantially flat member 6.

As the spring 18, which was compressed, attempts to return to its uncompressed position pressure is applied to the first flat plate member 6 which in turn applies pressure to the block of tofu 3 causing excess water to be forced out of the block of tofu. The excess water is collected above the first flat plate member 6. The water that has been collected is just poured out of the container member 2.

The second substantially flat member 12 has a pair of notches 22 disposed on diagonally opposed corners which makes it easier to engage the arm like projections 4. It should be noted that such container member 2 has feet 16 disposed on each corner.

It is presently preferred that such container member 2 is formed of plastic. It is also preferred that such first 6 and second flat plate members 12 as well as the lid member 24 also be made of plastic. It is also preferred that such pair of arm like projections 4 are integrally formed as a part of the container member 2.

It is preferred that such handle member 14 is substantially hollow and that substantially hollow handle member 14 further includes a means, generally designated 30, for engaging an upper end of the spring 18. Such means 30 includes a pair of pins 26 that are disposed inwardly on radially opposed sides of the handle member 14. It is also presently preferred that such substantially hollow handle member 14 is formed onto the upper surface of second substantially flat plate member 12.

Such arm like projections 4 that are disposed on upper surfaces and opposite sides of such container member 2 can point in the same direction or in opposite directions. However, it is presently preferred that such arm like projections 4 point in opposite directions.

Thus, the block of tofu 3 is placed in the container member 2 and the first flat plate member 6 is placed on top of the tofu 3. The second flat plate member 12 with the biasing means attached engages the arm like projections 4 and the biasing means 20 is disposed within the raised portion 8 and engages the upper surface of first flat plate member 6. The biasing means 20 (spring 18) applies pressure to the first flat plate member 6 which causes the block of tofu 3 to be squeezed and excess water to be removed. Since the excess water may require some time to be squeezed out of the tofu 3, the apparatus 10, with the block of tofu inside, can be stored in the refrigerator while the excess water is being removed from the tofu 3. After the excess water has been removed, the excess water is then discarded and the prepared block of tofu 3 in the container member 2 can be stored in the refrigerator again. A marinade can be poured on top of the tofu 3 and the lid member 24 placed on top of the container 2 and stored in the refrigerator. After the tofu has been marinated with the appropriate marinade it is now ready for further use.

Figure 5:
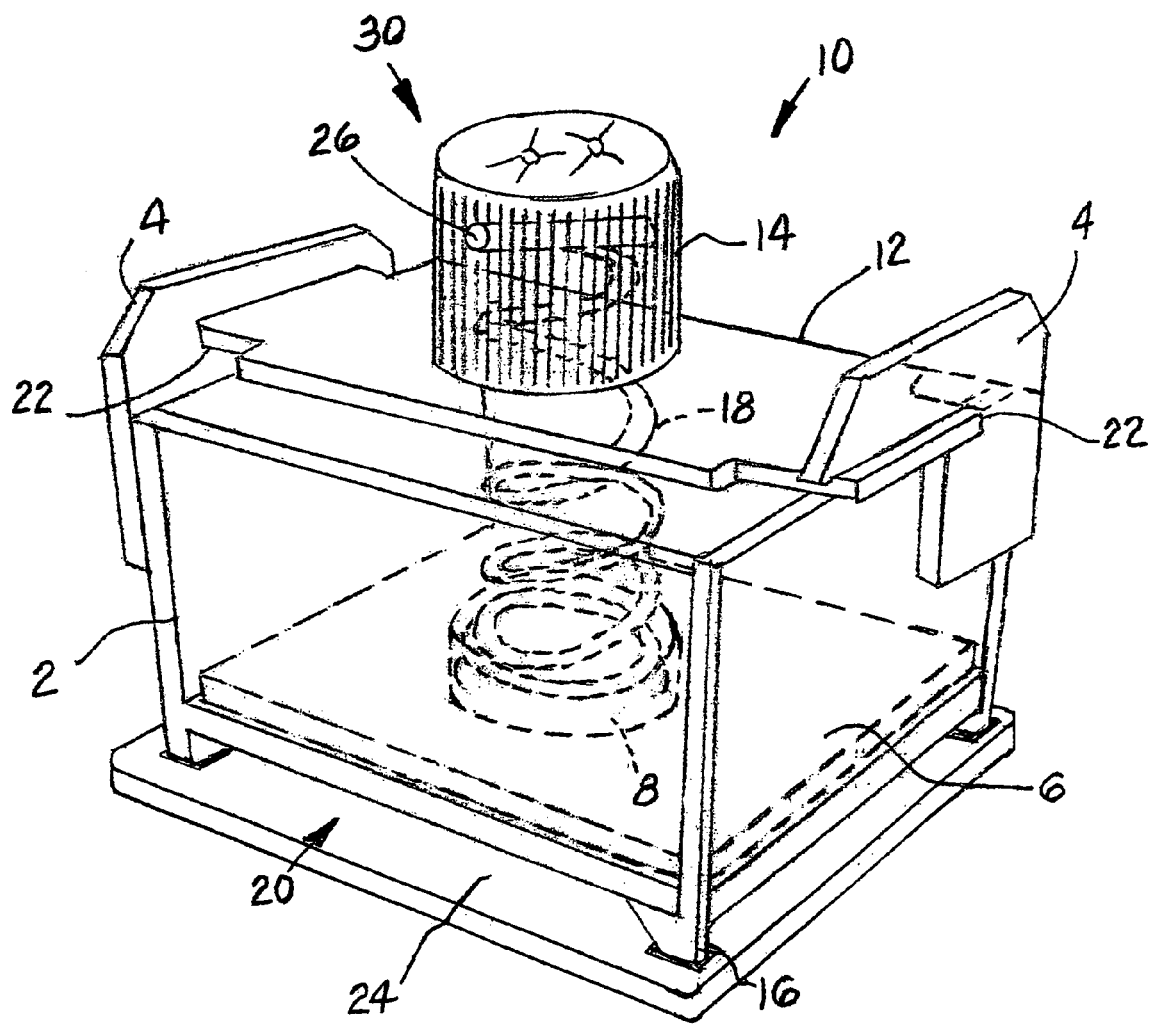
FIG. 5 is a perspective view of the apparatus showing the apparatus snapped onto the lid as a means of storing the lid when not in use.

Another embodiment of the invention is seen in FIG. 5 wherein the lid member 24 snaps onto the legs 16 of the container member 2. This is a means for storing the lid 24 when it is not being used as a lid 24, thus, conveniently keeping everything in one place so that parts do not get lost.

A second aspect of the invention provides an apparatus 10 for removing excess moisture from blocks of tofu 3 as commonly sold in grocery and health food stores. The apparatus 10 is very similar to that described above and comprises the container member 2 having a pair of arm like projections 4 disposed on upper surfaces and on opposite sides of the container member 2. There is a first substantially flat plate member 6 having at least one raised portion 8 disposed on an upper surface thereof. A second substantially flat plate member 12 engages the pair of arm like projections 4. A handle member 14 is disposed on an upper surface of the second substantially flat plate member 12 and a first end of the biasing means 20 is engageable with a lower surface of the second substantially flat plate member 12 and is caged between the lower surface of second substantially flat plate member 12 and the upper surface of the first substantially flat plate member 6 for pressing excess moisture out of such at least one block of tofu. Such second end of such biasing means 20 is disposed within such raised portion 8 that is the upper surface of the first plate member 6.

In yet another aspect of the invention there is provided a method for removing excess moisture from blocks of tofu as commonly sold in grocery and health food stores. The method comprises the steps of providing a container member 2. Such container member 2 has a first predetermined shape and a first predetermined surface area and having a pair of arm like projections 4 disposed on upper surfaces and on opposite sides of the container member 2. This is followed by a step of placing at least one block of tofu 3 in the container member 2. The next step is placing a first substantially flat plate member 6 inside the container member on top of such at least one block of tofu, such first substantially flat plate member 6 having a second predetermined surface area which is less that such first predetermined surface area by an amount at least sufficient to allow moisture to flow to a surface above an upper surface of such tofu 3. Such first substantially flat plate member 6 has at least one raised portion 8 on an upper surface thereof. This is followed by the step of engaging a second substantially flat plate member 12, having a handle member 14 disposed on an upper surface thereof and having a biasing means 20 connected to an inner surface of such handle member 14, with the pair of arm like projections 4 disposed on upper surfaces and on opposite sides of the container member 2. There is a step of caging the biasing means 20 between such upper surface of the first substantially flat plate member and an inner surface of such handle member when the second substantially flat plate member is engaged with the pair of arm like projections, such one end of the biasing means 20 is disposed within such raised portion 8 on the upper surface of the first plate member 6. There is a step of applying pressure on the block of tofu 3 by the first substantially flat plate member 6. Such first substantially flat plate member 6 being forced downward by the biasing means 20. The next step is removing water from the block of tofu 3 by the pressure exerted by the first substantially flat plate member 6 as a result of the action of the biasing means 20. There is a step of placing the apparatus 10 in the refrigerator after excess water is starting to be removed from the tofu 3. This is done to insure that the tofu 3 is not exposed to room temperatures any more than necessary since the removal of excess water may require some time. This step may be omitted; however, if it takes considerable time for the excess water to be removed that this step becomes important for hygienic or healthful reasons.

There is a step of collecting the excess water removed from the block of tofu 3 above such first substantially flat plate member 6 and a step of pouring out the excess water removed from the block of tofu 3. Next there is a step of returning the apparatus 10 with the tofu 3 in the container member 2, with excess water removed, to a refrigerated area until ready for use. A step of placing the lid member 24 on top of the container member 2 is done before the container 2 is returned to the refrigerator.

There can be the additional step of adding a marinade to the block of tofu, with excess water removed, stored in the container member 2 in a refrigerated area.

Thus, the present invention provides an apparatus for easily removing excess moisture from blocks of tofu. The apparatus can be constructed of a sturdy plastic material and is generally a substantially box or rectangular shape since presently most commercial tofu is sold in this shape. However, it is within the scope of the invention that such shape could be circular or another shape if the commercial suppliers of tofu would change the shape. It is designed to be approximately the size of a block of commercially available tofu. The base of the container unit that holds the tofu features four feet on the corners. There is a first flat plate member that is disposed within the container and sits on the top of the tofu and a second flat plate member that has a spring attached to it. The second flat plate member engages a pair of arm like projections disposed on upper surfaces and on opposite sides of the container. The spring engages the first plate member that sits on the top of the tofu so that as the spring exerts pressure on the first flat plate member sitting on the tofu excess water is removed from the tofu.

While a presently preferred embodiment and alternate embodiments of the present invention has been described in detail above, it should be understood that various other adaptations and/or modifications of the invention can be made by those persons who are particularly skilled in the art without departing from either the spirit of the invention or the scope of the appended claims.

I claim:

1. An apparatus for removing excess moisture from blocks of tofu as commonly sold in grocery and health food stores, said apparatus comprising:
   (a) an open top container member for holding at least one block of tofu, said container member having a first predetermined shape and a predetermined inner surface area;
   (b) a pair of arm like projections disposed on upper surfaces and on opposite sides of said container member;
   (c) a first substantially flat plate member having a predetermined surface area which is less than said predetermined inner surface area of said container member by an amount at least sufficient to allow moisture to flow to a surface above an upper surface of such blocks of tofu, said first substantially flat plate member disposed inside said container member and placed on top of at least one block of tofu, said first substantially flat plate member having at least one raised portion on an upper surface thereof;
   (d) a second substantially flat plate member for engagement with said pair of arm like projections;
   (e) a handle member disposed on an upper surface of said second substantially flat plate member; and
   (e) at least one biasing means caged between an inner surface of said handle member and said upper surface of said first substantially flat plate member for pressing excess moisture out of such at least one block of tofu.

2. The apparatus, according to claim 1, wherein said at least one biasing means is compressed when said second substantially flat platform member is forcibly engaged with said pair of arm like projections and said opposite end of said biasing means is disposed within said at least one raised portion and engages said upper surface of said first substantially flat member.

3. The apparatus, according to claim 1, wherein excess moisture removed from such block of tofu is collected above said first substantially flat plate member.

4. The apparatus, according to claim 1, wherein said at least one biasing means is compressed when said second substantially flat platform member is forcibly engaged with said pair of arm like projections and said opposite end of said biasing means is disposed within said at least one raised portion of said first substantially flat member.

5. The apparatus, according to claim 1, wherein said handle member is substantially hollow.

6. The apparatus, according to claim 5, wherein said substantially hollow handle member further includes a means for engaging an upper end of said biasing means.

7. The apparatus, according to claim 6, wherein said substantially hollow handle member is formed on said upper surface of said second substantially flat plate member.

8. The apparatus, according to claim 6, wherein said means includes a pair of pins disposed inwardly on radially opposed sides of said handle member.

9. The apparatus, according to claim 1, wherein said pair of arm like projections point in one of a same direction and in opposite directions.

10. The apparatus, according to claim 9, wherein said pair of arm like projections point in opposite directions.

11. The apparatus, according to claim 1, wherein said second substantially flat member has a pair of notches disposed on diagonally opposed corners.

12. The apparatus, according to claim 1, wherein said container is formed of plastic.

13. The apparatus, according to claim 1, wherein said pair of arm like projections are integrally formed with said container member.

14. The apparatus, according to claim 1, wherein said first and said second substantially flat plate members are formed of plastic.

15. The apparatus, according to claim 1, wherein said biasing means is a spring.

16. The apparatus, according to claim 1, wherein said container member further includes feet like projections disposed on each of four corners on an underside thereof.

17. An apparatus for removing excess moisture from blocks of tofu as commonly sold in grocery and health food stores, said apparatus comprising:

(a) an open top container member for holding at least one block of tofu, said container member having a first predetermined shape and a predetermined inner surface area;

(b) a pair of arm like projections disposed on upper surfaces and on opposite sides of said container member;

(c) a first substantially flat plate member having a predetermined surface area which is less than said predetermined inner surface area of said container member an amount at least sufficient to allow moisture to flow to a surface above an upper surface of such blocks of tofu, said first substantially flat plate member disposed inside said container member and placed on top of at least one block of tofu, said first substantially flat plate member having at least one raised portion on an upper surface thereof;

(d) a second substantially flat plate member for engagement with said pair of arm like projections;

(e) a handle member disposed on an upper surface of said second substantially flat plate member; and (e) at least one biasing means engageable with a lower surface of said second substantially flat plate member and caged between said lower surface of said second substantially flat plate member and said upper surface of said first substantially flat plate member for pressing excess moisture out of such at least one block of tofu.

* * * * *